(12) United States Patent
Fish et al.

(10) Patent No.: US 10,019,127 B2
(45) Date of Patent: Jul. 10, 2018

(54) REMOTE DISPLAY AREA INCLUDING INPUT LENSES EACH DEPICTING A REGION OF A GRAPHICAL USER INTERFACE

(75) Inventors: Keith A Fish, Fort Collins, CO (US); Byron A Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 503 days.

(21) Appl. No.: 14/375,819

(22) PCT Filed: Jul. 31, 2012

(86) PCT No.: PCT/US2012/048930
§ 371 (c)(1),
(2), (4) Date: Jul. 31, 2014

(87) PCT Pub. No.: WO2014/021832
PCT Pub. Date: Feb. 6, 2014

(65) Prior Publication Data
US 2015/0020025 A1 Jan. 15, 2015

(51) Int. Cl.
*G06F 3/048* (2013.01)
*G06F 3/0481* (2013.01)
*G06F 3/147* (2006.01)
*G06F 3/0484* (2013.01)

(52) U.S. Cl.
CPC ........ *G06F 3/0481* (2013.01); *G06F 3/04842* (2013.01); *G06F 3/147* (2013.01); *G06F 2203/0383* (2013.01)

(58) Field of Classification Search
CPC .... G06F 3/0481; G06F 3/04842; G06F 3/147; G06F 2203/0383
See application file for complete search history.

(56) References Cited

U.S. PATENT DOCUMENTS

| 6,448,958 B1 | 9/2002 | Muta |
| 6,724,403 B1 | 4/2004 | Santoro et al. |
| 7,009,626 B2 | 3/2006 | Anwar |

(Continued)

FOREIGN PATENT DOCUMENTS

| CN | 102193732 | 9/2011 |
| EP | 2172836 | 4/2010 |

OTHER PUBLICATIONS

"Citrix HDX Technology: Deliver Virtual IT Services in High Definition," Datasheet, 2011, pp. 1-4, Citrix Systems, Inc., Available at: <citrix.com/site/resources/dynamic/salesdocs/79746_Citrix_HDX_Technology_Datasheet.pdf>.

(Continued)

*Primary Examiner* — Kieu Vu
*Assistant Examiner* — Asteway T Gattew
(74) *Attorney, Agent, or Firm* — Trop, Pruner & Hu PC

(57) ABSTRACT

Examples disclosed herein relate to a remote display area including input lenses each depicting a region of a graphical user interface. Examples include, in response to detection of a graphical user interface (GUI) input event with a remote computing device within an input lens having input focus, invoking the GUI input event at a location of the GUI of a local computing device within the region of the GUI depicted in the input lens having input focus.

16 Claims, 8 Drawing Sheets

(56) References Cited

U.S. PATENT DOCUMENTS

| | | |
|---|---|---|
| 7,081,904 B2 | 7/2006 | Zoller et al. |
| 7,219,309 B2 | 5/2007 | Kaasila et al. |
| 7,657,844 B2 | 2/2010 | Gibson et al. |
| 7,757,001 B2 | 7/2010 | Van Ieperen |
| 7,870,496 B1 | 1/2011 | Sherwani |
| 7,986,331 B1 | 7/2011 | Meridian |
| 2003/0006995 A1 | 1/2003 | Smith et al. |
| 2003/0214519 A1 | 11/2003 | Smith et al. |
| 2004/0125138 A1 | 7/2004 | Jetha et al. |
| 2008/0222618 A1 | 9/2008 | Valtchev |
| 2009/0284542 A1 | 11/2009 | Baar et al. |
| 2009/0300701 A1 | 12/2009 | Karaoguz et al. |
| 2010/0026718 A1 | 2/2010 | Jetha et al. |
| 2010/0171766 A1 | 7/2010 | Jones et al. |
| 2010/0262907 A1 | 10/2010 | Shoemaker et al. |
| 2010/0268762 A1 | 10/2010 | Pahlavan et al. |
| 2010/0269047 A1 | 10/2010 | Pahlavan et al. |
| 2010/0269152 A1 | 10/2010 | Pahlavan et al. |
| 2010/0271288 A1* | 10/2010 | Srinivasan ............ G06F 3/1454 345/2.2 |
| 2011/0069086 A1 | 3/2011 | Shoemaker et al. |
| 2011/0093822 A1* | 4/2011 | Sherwani ................ H04L 67/38 715/863 |
| 2011/0099513 A1 | 4/2011 | Ameline |
| 2011/0214063 A1 | 9/2011 | Saul |
| 2011/0219420 A1 | 9/2011 | Raveendran et al. |
| 2013/0104065 A1* | 4/2013 | Stecher ................ G06F 3/0481 715/767 |
| 2013/0139103 A1* | 5/2013 | Laborczfalvi ......... G06F 3/0484 715/794 |

OTHER PUBLICATIONS

"DCV Installation and User Guide," Version 2012, Jul. 9, 2012 (rev.-1), pp. 1-74, NICE, Available at: <nice-software.com/storage/nice-dcv/.2012.1/docs/nice-dcv-guide-2012.1-6630.pdf>.

"DCV: Desktop Cloud Visualization," Hot in NICE DCV 2012, pp. 1-2, Nice Software, Available at: <nice-software.com/flyers/DCV-flyer.pdf>.

"Desktop Cloud Virtualization—3D Remote—NICE," 2012, pp. 1-4, NICE, Available at: <nice-software.com/products/dcv>.

"HDX(TM) Technologies," 2012, pp. 1-2, Citrix Systems, Inc., Available at: <hdx.citrix.com/hdx-overview>.

"HP Remote Graphics Software 5.4.7: User Guide," Oct. 2011, Fourth Edition, pp. 1-247, Hewlett-Packard Development Company, L.P., Available at: <h20331.www2.hp.com/hpsub/downloads/HPRGSUserGuide.pdf>.

"PC-over-IP Remote Display Technology: True Zero Client Desktop Virtualization," 2011, pp. 1-3, Teradici Corporation, Available at: <web.archive.org/web/20110716210633/http://www.teradici.com/pcoip/pcoip-technology.php> and <http://www.teradici.com/pcoip/pcoip-technology.php>.

Citrix Online, "GoToMyPC (Remote Desktop)," Nov. 29, 2011, Version 2.0.634.0, pp. 1-3, Citrix Online, LLC, Available at: <itunes.apple.com/us/app/gotomypc-remote-desktop/id417742726>.

International Search Report and Written Opinion, International Application No. PCT/US2012/048930, dated Mar. 29, 2013, pp. 1-7.

Joeng Kim, et al., "An Application Streaming Service for Mobile Handheld Devices," IEEE International Conference on Services Computing, Sep. 18-22, 2006, pp. 323-326.

* cited by examiner

REMOTE DISPLAY AREA INCLUDING INPUT LENSES EACH DEPICTING A REGION OF A GRAPHICAL USER INTERFACE

BACKGROUND

A computing device such as a desktop computer, notebook computer, or tablet computer may provide a graphical user interface (GUI) for user interaction with content of the computing device. Such computing devices may enable a user to interact with objects displayed by the GUI using at least one input device, such as a mouse, a keyboard, or the like. In some examples, a computing device may be accessed remotely using another device to view and interact with the GUI of the computing device.

BRIEF DESCRIPTION OF THE DRAWINGS

The following detailed description references the drawings, wherein.

DETAILED DESCRIPTION

Figure 1:
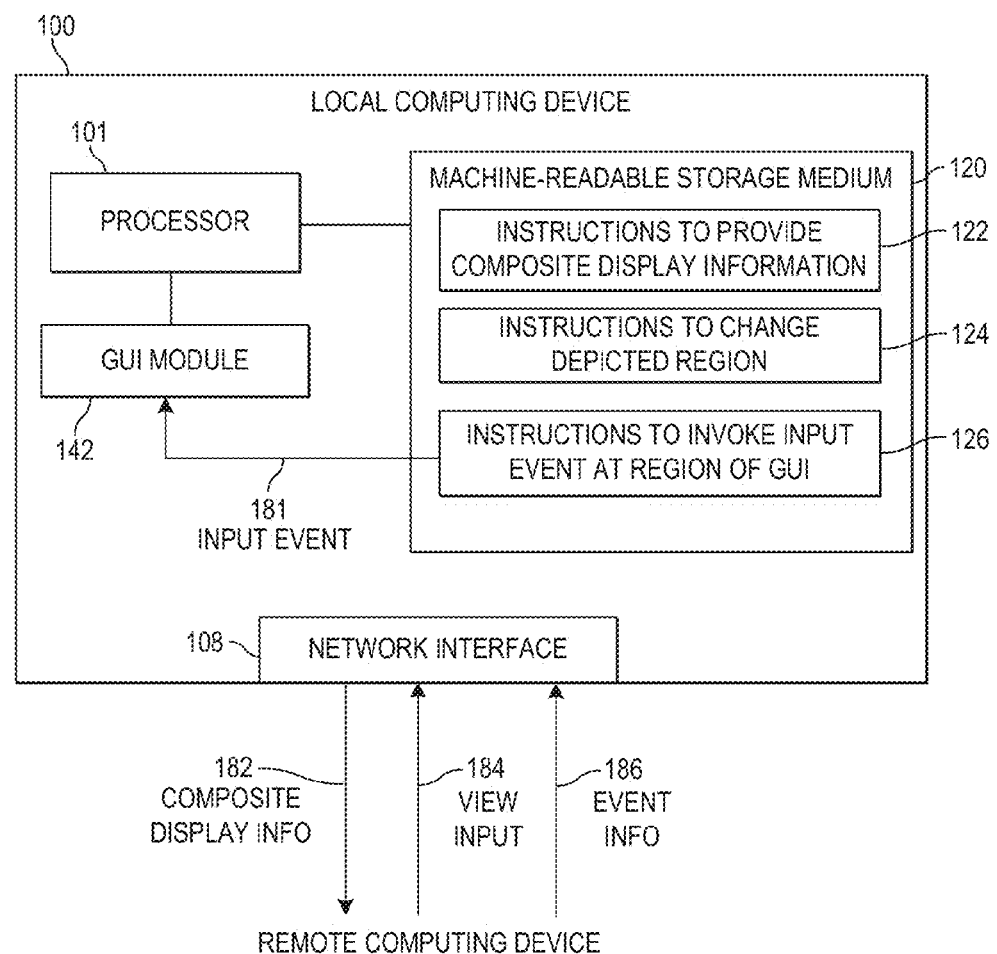
FIG. 1 is a block diagram of an example local computing device to provide composite display information to a remote computing device.

As noted above, a computing device may be accessed remotely using another device to view and interact with a graphical user interface (GUI) of the computing device. For example, applications at a local computing device may be accessed over a computer network using a remote computing device to view and interact with a GUI of the local computing device. In some examples, the local computing device may be a professional workstation having a large, high-resolution display and including visually complex applications that exploit the high-resolution display to enable greater user productivity by displaying a plurality of control features, such as icons, menus, dialogs, and the like, in addition to content being manipulated.

However, the displays of many remote computing devices have lower resolution, smaller size, or both, relative to such workstation displays. For example, the display of a tablet computer may be smaller and have lower resolution than the display of a professional workstation computing device. In such examples, the smaller, lower resolution remote computing device display may not output the GUI of the local computing device with sufficient size or clarity to enable a user to productively utilize a visually complex application of the local computing device. Rather than displaying the entire GUI of the local computing device at the remote computing device, the remote computing device may instead display a selected portion of the GUI. In such examples, the selected portion may be manipulated (e.g., panned, zoomed) to view different area of the GUI a piece at a time. However, using such a partial interface for the type of visually complex applications described above may result in a user performing an excessive number of pan and zoom operations to go back and forth between application content being manipulated and application controls, such icons, menus, and the like.

To address these issues, examples described herein provide a remote access system providing composite display information useable by a remote computing device to display a remote display area including a plurality of input lenses each depicting a respective region of a GUI of a local computing device. In such examples, each of the input lenses may be manipulated to change a GUI region depicted in the input lens independent of the other input lenses. Also, in examples described herein, an input event received within any of the input lenses may be invoked at the local computing device in the region of the GUI depicted in that input lens. In such examples, application content may be displayed in one input lens with relatively high resolution, and selected application controls regions (e.g., toolbars, etc.) may be displayed in different input lenses simultaneously, also with relatively high resolution.

In such examples, portions of application content and application control regions may be visible with relatively high resolution at the same time. Also, in some examples, the input lenses may be manipulated independently, so panning one lens does not alter the GUI region depicted in any other lens, for example. In such examples, user interactions may alternate between application content and application controls without excessive view changes (e.g., panning, zooming, etc.). In this manner, examples described herein may provide a system in which a low-resolution display of a remote computing device may be utilized to access visually complex applications of a local computing device without re-writing the applications to provide low-resolution user interfaces tailored for low-resolution displays (e.g., tablet displays).

Referring now to the drawings, FIG. 1 is a block diagram of an example local computing device 100 to provide composite display information to a remote computing device. As used herein, a "computing device" may be a desktop or notebook computer, workstation, server, tablet computer, mobile phone, smart device, or any other processing device or equipment. In the example of FIG. 1, local computing device 100 includes a processor 101, a network interface 108, and a machine-readable storage medium 120 encoded with instructions 122, 124, and 126. In some examples, storage medium 120 may include additional instructions. In other examples, instructions 122, 124, 126, and any other instructions described herein in relation to storage medium 120, may be stored remotely from local computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 101 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

In the example of FIG. 1, local computing device 100 may include a graphical user interface (GUI) module 142 that may implement a GUI on local computing device 100. GUI module 142 may generate local display information and store the local display information in memory of local computing device 100. GUI module 142 may also output the local display information on an integral display of local computing device 100 or a display connected to a local peripheral interface of local computing device 100 (e.g., a local port or bus), to display the GUI of local computing device 100. In some examples, an operating system (OS) of local computing device 100 may comprise GUI module 142. In some examples, the functionalities of GUI module 142 may be implemented in the form of executable instructions encoded on a machine-readable storage medium, in the form of electronic circuitry, or a combination thereof.

In the example of FIG. 1, instructions 122 may provide composite display information 182 to a remote computing device with network interface 108. The composite display information 182 may be useable by the remote computing device to display a remote display area including a plurality of input lenses each depicting a respective region of a graphical user interface (GUI) of local computing device 100. As used herein, a "remote display area" is a graphical region displayed by a remote computing device in which portions of the GUI of a local computing device are depicted. For example, a remote display area may be a window displayed at the remote computing device in which the portions of the GUI of local computing device 100 are displayed. As used herein, an "input lens" is a graphical area associated with a region of a GUI of a local computing device and in which the associated region of the GUI is depicted in a remote display area of a remote computing device.

In some examples, composite display information 182 may be provided to the remote computing device as part of a remote desktop protocol providing remote access to local computing device 100. In such examples, the remote computing device may be used to view and interact with a GUI (e.g., a desktop) of local computing device 100. In examples described herein, the remote computing device may be any type of computing device as described herein. In some examples, instructions 122 may continuously derive composite display information 182 from local display information generated by GUI module 142 such that the remote computing device is able to use the composite display information 182 to continuously display at least a portion of the GUI of local computing device 100. For example, instructions 122 may continuously provide composite display information 182 during a given remote desktop session between local computing device 100 and the remote computing device. In some examples, the remote display area may be a window displayed by a remote desktop protocol application of the remote computing device in which regions of the GUI of local computing device 100 are displayed by the remote computing device. In some examples, composite display information 182 may be image data or other data ready for display at the remote computing device. In other examples, remote computing device may perform at least some processing based on composite display information 182 to generate information for display as the remote display area at the remote computing device.

As noted above, instructions 122 may provide composite display information 182 to the remote computing device with network interface 108. As used herein, a "network interface" is at least one hardware component that may be used by a computing device to communicate with at least one other computing device via a communications network including at least one computer network, at least one telephone network, or a combination thereof. In some examples, suitable computer networks include, for example, a local area network (LAN), a wireless local area network (WLAN), a virtual private network (VPN), the internet, and the like.

In some examples, the remote computing device may receive input (e.g., user input) via at least one input device, such as a mouse, a keyboard, a hardware control of the remote computing device (e.g., buttons, etc.), a touch-sensitive display, or the like. In such examples, the remote computing device may detect predefined control actions input to the remote computing device via any one of at least one input device. Predefined control actions may include predefined view manipulation actions, focus selection actions, profile selection actions, lens hiding actions, and the like. In some examples, each of the control actions may be any suitable predefined input or input sequence that may be received from an input device or combination of input devices. For example, if the remote computing device includes a touch-sensitive display, at least some of the control actions, such as the view manipulation actions, may be respective predefined touch gestures (e.g., swipe gestures, pinch gestures, etc.) detectable with the touch-sensitive display. In some examples, at least some of the control actions may be input via a menu invoked by a predefined input sequence input via a keyboard, for example, or another input device.

In the example of FIG. 1, in response to the detection of a view manipulation action at the remote computing device, instructions 124 may change which region of the GUI is depicted in any particular one of input lenses associated with the detected view manipulation action. In such examples, instructions 124 may change which region is depicted in the particular input lens without changing which region of the GUI is depicted in any other input lens. In this manner, examples described herein may enable a user to alter the view of the GUI depicted in any of the input lenses via a view manipulation action, without altering the view depicted in any other input lens. In examples described herein, each view manipulation action is a respective predefined control action detectable by a remote computing device.

In some examples, in response to detecting a view manipulation action, the remote computing device may provide, to local computing device 100, view input 184 specifying a view manipulation operation and location information, each associated with the detected view manipulation action. View input 184 may be a view manipulation command in some examples. Instructions 124 may receive view input 184 via network interface 108 and determine which of the displayed input lenses is associated with the detected view manipulation action. For example, instructions 124 may determine that the particular input lens associated with the detected view manipulation action is the input lens that has input focus at the time of the view manipulation action. As used herein, an input lens having "input focus" at a given time is a lens designated for receiving input at the given time. In other examples, instructions 124 may determine the particular input lens associated with the action based on the location information. For example, instructions 124 may determine that an input lens in which the action was performed is the particular input lens associated with the view manipulation action.

After identifying the particular input lens associated with the detected view manipulation action, instructions 124 may apply the view manipulation operation specified in the view input 184 to change which region of the GUI is depicted in the particular input lens. In some examples, each input lens is associated with a lens area. As used herein, a "lens area" is information defining a region of a GUI of a local computing device to be depicted at a remote computing device within an associated input lens. In some examples, instructions 124 may apply the view manipulation operation by altering the lens area associated with the particular input lens (i.e., changing the region of the GUI defined by the lens area).

For example, to apply an operation to pan the particular input lens, instructions 124 may change the coordinates of the location of the associated lens area relative to the GUI, while maintaining the dimensions of the lens area, to effectively move the associated lens area. As another example, to apply an operation to zoom the particular input lens, instructions 124 may increase (e.g., for a zoom out operation) or decrease (e.g., for a zoom in operation) the dimensions of the associated lens area. In this manner, instructions 124 may change which region of the GUI is depicted in the particular input lens without changing which region of the GUI is depicted in any other input lens because altering the lens area associated with the particular input lens does not alter any other lens area. In such examples, the respective views depicted in each of the input lenses may be altered independent of one another via view manipulation actions at the remote computing device.

As noted above, in some examples, the remote computing device may detect predefined control actions input to the remote computing device via any one of at least one input device. In such examples, the remote computing device may also detect GUI input events input to the remote computing device. As used herein, a "GUI input event" is input received at a remote computing device via at least one input device that is not part of any predefined control action detectable by the remote computing device. Example GUI input events may include click events received from an input device such as a mouse or other pointing device, keystrokes received from a keyboard, touch events received via a touch-sensitive display, and the like.

For example, a single click with a mouse may be detected by the remote computing device as a "click-down" event and a "click-up" event, respectively, each of which may be detected as a GUI input event if not part of a predefined control action. As another example, a tap event performed on a touch-sensitive display of the remote computing device (e.g., with a finger, stylus, etc.) may be sensed by the remote computing device as a "touch-down" event and a "touch-up" event, respectively, each of which may be detected as a GUI input event if not part of a predefined control action. In examples described herein, the types of GUI input events detected by the remote computing device may vary depending upon at least one of the type of remote computing device, the type of input devices used with the remote computing device, the operating system of the remote computing device, and the like.

In the example of FIG. 1, in response to detection of a GUI input event with the remote computing device within any given one of the displayed input lenses when the given input lens has input focus, instructions 126 may invoke the GUI input event at local computing device 100 within the region of the GUI depicted in the given input lens. In this manner, examples described herein may enable a user to provide GUI input events to the GUI of a local computing device via any of a plurality of input lenses displayed at a remote computing device. In such examples, input may be provided to the GUI of the local computing device via a given input lens when the input lens has input focus.

For example, in response to detecting a GUI input event, the remote computing device may provide, to local computing device 100, event information 186 specifying at least the type and location of the detected GUI input event. In such examples, instructions 126 may receive event information 186 via network interface 108 and determine whether the location information indicates that the detected GUI input event was received within the portion of the remote display area in which the input lens having input focus is displayed. If so, then instructions 126 may invoke the detected GUI input event at local computing device 100 within the region of the GUI depicted in the input lens having input focus.

In some examples, instructions 126 may invoke the detected GUI input event at the location of the GUI depicted in the remote display area where the GUI input event was received. For example, instructions 126 may determine the GUI location at which to invoke the GUI input event based on the location specified in event information 186 (which may be coordinates relative to the remote display area), the location of the input lens having input focus within the remote display area, and the region of the GUI within the lens area corresponding to the input lens having input focus. In some examples, after determining the GUI location at which to invoke the GUI input event, instructions 126 may invoke the detected GUI input event at local computing device 100 via an Application Programming Interface (API) message recognized by the OS. In such examples, the API message may specifying the type input event to invoke (e.g., the type of the detected GUI input event) and the determined GUI location at which to invoke the GUI input event.

For example, in response to detecting a click event within the remote display area displayed at the remote computing device, the remote computing device may provide event information 186, specifying a click event and the location of the click event, to local computing device 100. If instructions 126 determine that the click event occurred within a displayed input lens having input focus at the time of the click event, then instructions 126 may determine the GUI location corresponding to the location of the input lens at which the click event was received, and invoke the click event at the determined location of the GUI via an API message, for example.

In other examples, in response to detecting a touch event with a touch-sensitive display of the remote computing device, the remote computing device may provide event information 186 specifying the location and type of the touch event. In some examples, instructions 126 may map touch events to other types of input, such as input events that may be received from a mouse or other pointing device. For example, instructions 126 may map a tap event to a click of a left mouse button, a held tap event to a click of a right mouse button, a touch gesture (e.g., a vertical pinch or spread, etc.) to mouse scroll wheel movement, and the like. In such examples, in response to information 186 indicating a touch event, instructions 126 may invoke, at local computing device 100, the type of event to which the touch event is mapped. For example, in response information 186 indicating a touch event, instructions 126 may invoke a left mouse click at the GUI of local computing device 100, at a GUI location determined as described above. In such examples, the event may be invoked via an API message. In some examples, functionalities described herein in relation to FIG. 1 may be provided in combination with functionalities described herein in relation to any of FIGS. 2A-5.

Figure 2A:
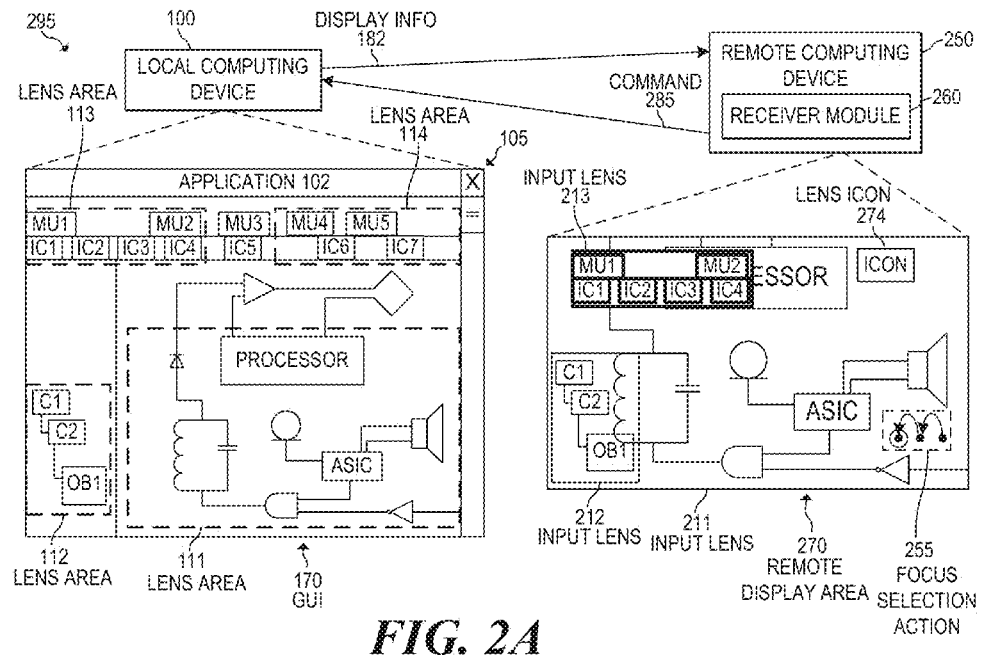
FIG. 2A is a diagram of an example computing system displaying a remote display area at a remote computing device.

FIG. 2A is a diagram of an example computing system 295 displaying a remote display area 270 at a remote computing device 250. In the example of FIG. 2A, computing system 295 includes local computing device 100, as described above in relation to FIG. 2A. Computing system 295 also includes a remote computing device 250 comprising receiver module 260. In some examples, the functionalities of receiver module 260 may be implemented in the form of executable instructions encoded on a machine-readable storage medium, in the form of electronic circuitry, or a combination thereof.

As described above in relation to FIG. 1, a GUI module 142 of local computing device 100 may generate local display information for output on a local display of local computing device 100. In such examples, the local display information may be used to display a GUI 170 at the local display. In the example of FIG. 2A, GUI 170 is displaying a window 105 of an application 102. While application 102 may be any type of application, in the example of FIG. 2A, application 102 is a circuit design application. Window 105 comprises an application content area, and a plurality of control areas. In the example of FIG. 2A, the application content area displays a circuit design editable with application 102. The control areas include a menu toolbar including menus MU1-MU5, another toolbar including icons IC1-IC7, and a hierarchical directory area for object selection. The directory area displays a selectable object OBJ1, which is part of an object class C2, which in turn is part of an object class C1.

Figure 3:
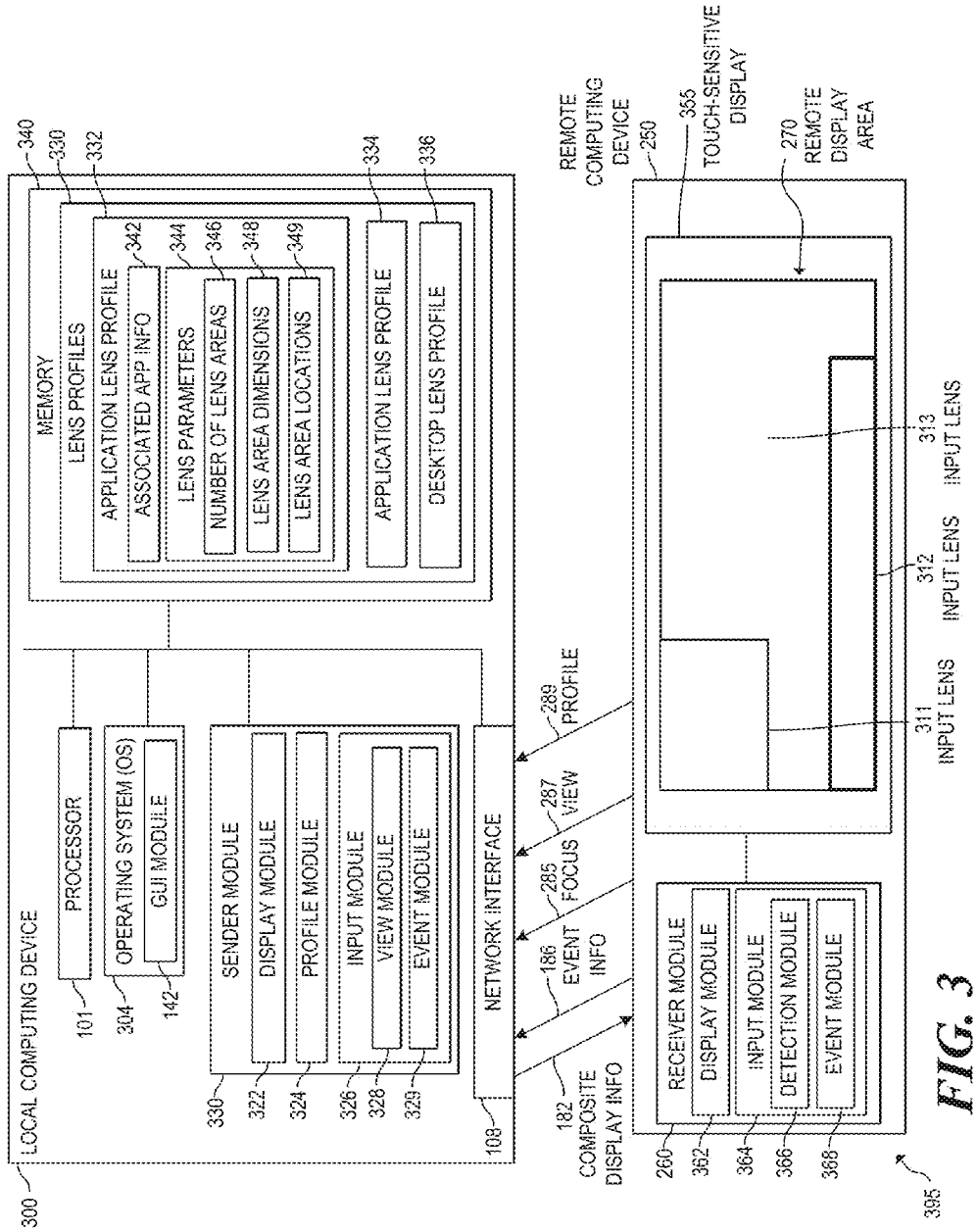
FIG. 3 is a block diagram of an example computing system including a profile module of a local computing device to receive a selection of a lens profile from a remote computing device.

In the example of FIG. 2A, window 105 of application 102 is sized to fill the frame of GUI 170 generated for display at the local display. In other examples, the window of application 102 may be sized smaller such that at least portions of other elements (e.g., a desktop, other windows, icons, toolbars, etc.) are displayed by GUI 170 along with the window of application 102. As described above in relation to FIG. 1, instructions 122 of local computing device 100 may provide, to a remote computing device 250, composite display information 182 useable by the remote computing device 250 to display a remote display area 270 including a plurality of input lenses each depicting a respective region of GUI 170 of local computing device 100. Receiver module 260 of remote computing device 250 may receive composite display information 182 and generate remote display area 270 based on information 182. In such examples, module 260 may display remote display area 270 on a display of or connected to remote computing device 250. Module 260 may display remote display area 270 such that it is coextensive with the display of remote computing device 250, or such that area 270 occupies less than all of the display (as illustrated in FIG. 3, described below).

Instructions 122 may generate composite display information 182 based on a plurality of lens areas. In some examples, instructions 122 may generate composite display information 182 based on a predefined set of lens areas, such as a set of lens areas specified in a lens profile. In such examples, the predefined set of lens areas may indicate the respective dimensions and locations of each of the lens areas of the lens profile. In the example of FIG. 2A, instructions 122 may generate the composite display information 182 based on lens areas 111-114, each of which defines a different region of GUI 170. As illustrated in FIG. 2A, an application content portion of window 105 is displayed in the region of GUI 170 defined by lens area 111, a portion of the directory area of window 105 is displayed in the region defined by lens area 112, and different portions of the toolbars of window 105 are displayed in the regions defined by lens areas 113 and 114, respectively.

In such examples, instructions 122 may generate composite display information 182 useable by remote computing device 250 to display remote display area 270 including input lenses 211-213 depicting regions of GUI 170 displayed in lens areas 111-113. In such examples, input lens 211 may depict the region displayed in lens area 111, input lens 212 may depict the region displayed in lens area 112, and input lens 213 may depict the region displayed in lens area 113. In the example of FIG. 2A, input lens 211 is a content input lens coextensive with remote display area 270 and depicting a region of GUI 170 displaying an application content portion of window 105, and each of input lenses 212 and 213 is a control input lens, smaller than the content input lens 211, and depicting a respective region of GUI 170 displaying a control portion of window 105. In some examples, remote display area 270 may also include a lens icon 274 representing an input lens associated with lens area 114. The input lens associated with lens area 114 is not displayed in remote display area 270 in the example of FIG. 2A, but may be displayed in remote display area 270 when it is given input focus.

By generating composite display information 182 useable to display remote display area 270, examples described herein may enable a remote computing device 250, having a display with at least one of lower resolution and smaller size than a display of local computing device 100, to display select portions of GUI 170 at a suitable size relative to the size and resolution of the display of the remote computing device 250. In some examples, instructions 122 may generate composite display information 182 such that, when remote display area 270 is displayed, at least two of the input lenses of remote display area 270 overlap within remote display area 270. In this manner, examples described herein may consolidate the display of several regions of GUI 170 at remote computing device 250.

For example, instructions 122 may generate information 182 such that input lenses 211 and 212 overlap and input lenses 211 and 213 overlap in remote display area 270, as illustrated in FIG. 2A. Additionally, instructions 122 may generate information 182 such that the input lenses have a layering order. In such examples, instructions 122 may generate information 182 such that, when at least two input lenses overlap, whichever of the input lenses is layered on top of the others is at least partially transparent when it does not have input focus. In some examples, the partial transparency of the input lens on top may enable portion of an underlying input lens to be viewed through the input lens on top.

In the example of FIG. 2A, input lenses 211 and 212 overlap, and input lens 212 is layered on top of input lens 211. In such examples, input lens 212 is partially transparent when it does not have input focus such that portions of input lens 211 are visible through input lens 212, as illustrated in FIG. 2A. In some examples, an input lens layered on top of another input lens may be less transparent when it has input focus than when it does not. For example, input lens 213 may be opaque when it has input focus, as illustrated in FIG. 2A. In such examples, input lens 213 layered on top of input lens 211 may be partially transparent when it does not have input focus. In other examples, when input lens 213 has input focus, it may be less transparent than when it does not have input focus, while not being completely opaque. In examples illustrated in FIGS. 2A-3, input lenses having input focus are illustrated with thicker lines than input lenses not having input focus.

In some examples, receiver module 260 of remote computing device 250 may detect predefined focus selection actions input via at least one input device. In some examples, each predefined focus selection action may be any suitable predefined input or input sequence that may be received from an input device or combination of input devices. For example, if remote computing device 250 includes a touch-sensitive display, at least some of the focus selection actions may be respective predefined touch gestures detectable with the touch-sensitive display. In some examples, each of the predefined focus selection actions may be associated with a respective one of the input lenses included in remote display area 270. In such examples, in response to detecting a focus selection action, module 260 may provide, to local computing device 100, an input focus command 285 identifying the input lens associated with the detected focus selection action. In response to receiving input focus command 285, instructions 122 may give input focus to whichever of the input lenses is identified in input focus command 285.

In some examples, the predefined focus selection actions may each include a three-finger tapping action performed by simultaneously tapping or sequentially drumming three fingers on a touch-sensitive display (e.g., a multi-touch sensitive display), followed by an additional tap proximate to where the three-finger tapping was performed. For example, as represented in FIG. 2A, a predefined focus selection action 255 may be performed by drumming three fingers sequentially from right to left (e.g., a right ring finger, middle finder, and index finger) and then performing an additional tap (e.g., with the index finger) at a left side of where the drumming action was performed. In other predefined focus selection actions, the additional tap may be performed elsewhere, such as to the right, top or bottom of the drumming region, for example. Still other predefined touch actions may include a left to right drumming action instead of a right to left drumming action. In such examples, multiple focus selection actions including left to right drumming may be distinguished according to the location of the additional tap relative to the location of the drumming. Also, in some examples, multiple focus selection actions including a simultaneous three-finger tapping action may be distinguished according to the location of the additional tap relative to the location of the three-finger tapping.

In such examples, each of the predefined focus selection actions may be associated with an input lens, and receiver module 260 may, in response to detecting the predefined focus selection action, command local computing device 100 to give input focus to the associated input lens. For example, in the example of FIG. 2A, focus selection action 255 may be associated with input lens 211. In such examples, in response to detecting focus selection action 255 via a touch-sensitive display, receiver module 260 may provide input focus command 285, identifying input lens 211, to local computing device 100, which may give input focus to input lens 211 in response.

Figure 2B:
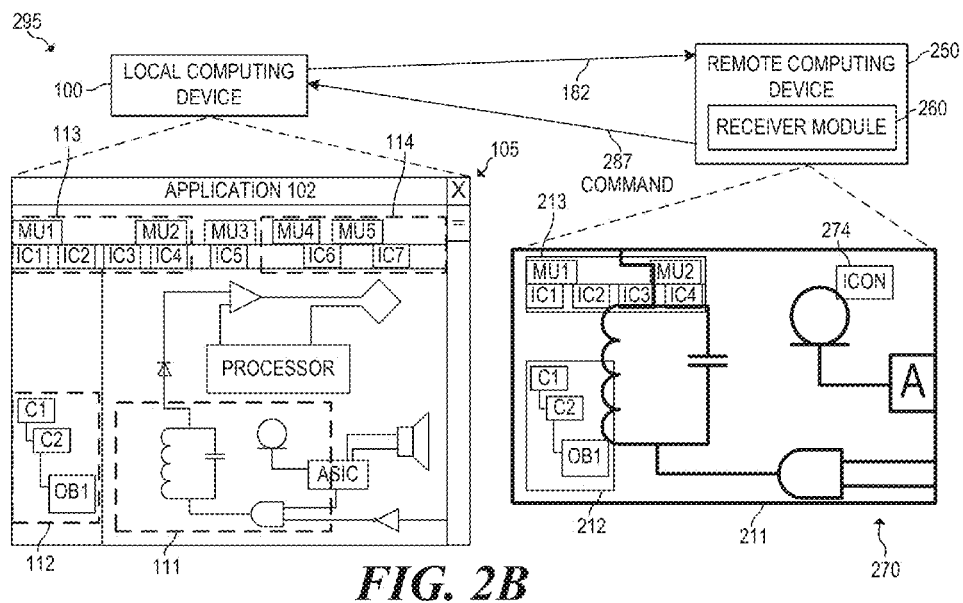
FIG. 2B is a diagram of the example computing system of FIG. 2A displaying a remote display area after a view manipulation action for one of the input lenses of the remote display area.

FIG. 2B is a diagram of the example computing system 295 of FIG. 2A displaying remote display area 270 after a view manipulation action for one of the input lenses of the remote display area 270. In the example of FIG. 2B, instructions 122 of local computing device 100 may give input focus to input lens 211 in response to input focus command 285 identifying input lens 211. In some examples, when instructions 122 move input focus from one input lens to another, instructions 122 may generate composite display information 182 such that, if remote display area 270 is displayed, the input lens that previously had input focus has at least one of increased transparency, decreased size, and decreased scale relative to when the input lens had input focus. For example, after input focus moves from input lens 213 to input lens 211, instructions 122 may generate composite display information 182 such that input lens 213 has increased transparency relative to when it had input focus, as shown in FIGS. 2A and 2B. In such examples, when input focus has moved to input lens 211, input lens 213 becomes more transparent and portions of input lens 211 are visible through input lens 213.

In the example of FIG. 2B, after instructions 122 give input focus to input lens 211, receiver module 260 may detect a view manipulation action. For example, if remote display area 270 is displayed on a touch-sensitive display of remote computing device 250, receiver module 260 may detect a two-finger spread gesture, which module 260 may determine is associated with a zoom-in operation. In response, module 260 may provide a view manipulation command 287 specifying a zoom-in operation to local computing device 100. In response to command 287, instructions 124 of local computing device 100 may determine that input lens 211 is associated with the command (because it has input focus), and apply the zoom-in operation to change which region of GUI 170 is depicted in input lens 211. In some examples, instructions 124 may decrease the dimensions of lens area 111 associated with input lens 211 to apply the zoom-in operation, as shown in FIGS. 2A and 2B. In such examples, instructions 122 may scale the smaller region of GUI 170 that is within the changed lens area 111 to fit the dimensions of input lens 211, whose size does not change. In this manner, instructions 124 may perform the zoom-in operation. The zoomed-in input lens 211 may be reflected in information 182 generated by instructions 122.

Figure 2C:
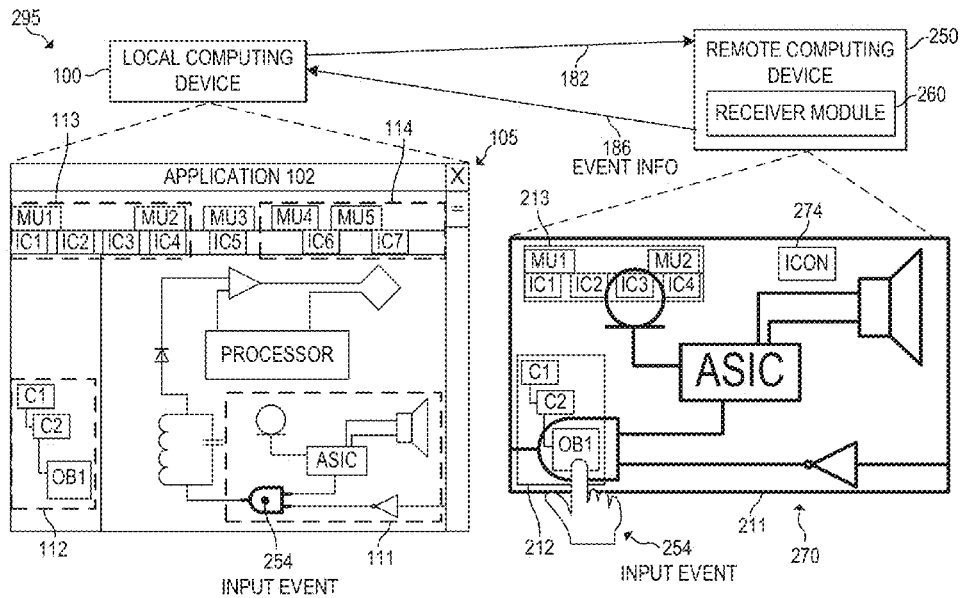
FIG. 2C is a diagram of the example computing system of FIG. 2B in which an input event is received within an input lens having input focus in the remote display area.

In some examples, after instructions 124 perform the zoom-in operation, receiver module 260 may detect another view manipulation action. For example, receiver module 260 may detect a predefined action (e.g., a swipe action, etc.) associated with panning to the right. In response, module 260 may provide another view manipulation command 287 specifying a pan-right operation to local computing device 100. In response, instructions 124 may again determine that input lens 211 is associated with command 287 since it has input focus, and apply the pan-right operation to change which region of GUI 170 is depicted in input lens 211. In the example of FIG. 2B, instructions 124 may change the coordinates of lens area 111 associated with input lens 211 to apply the pan-right operation. For example, instructions 124 may move lens area 111 to the right relative to GUI 170 (as shown in FIGS. 2B and 2C), to thereby change which region of GUI 170 is displayed in input lens 211. In such examples, instructions 122 generate information 182 such the region depicted in input lens 211 is the region of GUI 170 displayed in the changed lens area 111.

FIG. 2C is a diagram of the example computing system 295 of FIG. 2B in which an input event is received within an input lens having input focus in remote display area 270. In the example of FIG. 2C, receiver module 260 may detect a GUI input event 254 input to remote computing device 250. For example, module 260 may detect, via a touch-sensitive display, a tap event within remote display area 270 as GUI input event 254. In other examples, GUI input event 254 may be any other suitable input (e.g., a mouse click, etc.).

In the example of FIG. 2C, in response to detecting GUI input event 254, module 260 may provide, to local computing device 100, event information 186 specifying at least the type and location of detected GUI input event 254. In such examples, instructions 126 may determine from information 186 that the detected GUI input event 254 was received within input lens 211, which has input focus. In response, instructions 126 may invoke, at local computing device 100, the detected GUI input event at the location of GUI 170 depicted in remote display area 270 where GUI input event 254 was received.

For example, based on the location included in event information 186, instructions 126 may invoke GUI input event 254 at GUI 170 at a location within lens area 111 corresponding to the location within input lens 211 at which the GUI input event 254 was received. As illustrated in FIG. 2C, GUI input event 254 was received at the AND gate displayed in input lens 211, and instructions 126 may invoke GUI input event 254 at the AND gate of GUI 170 displayed in lens area 111. In the example of FIG. 2C, although GUI input event 254 is received at a location of remote display area 270 where input lenses 211 and 212 overlap, instructions 126 invoke the GUI input event 254 within the region of GUI 170 depicted in input lens 211, since that is the input lens with input focus at the time of GUI input event 254.

Figure 2D:
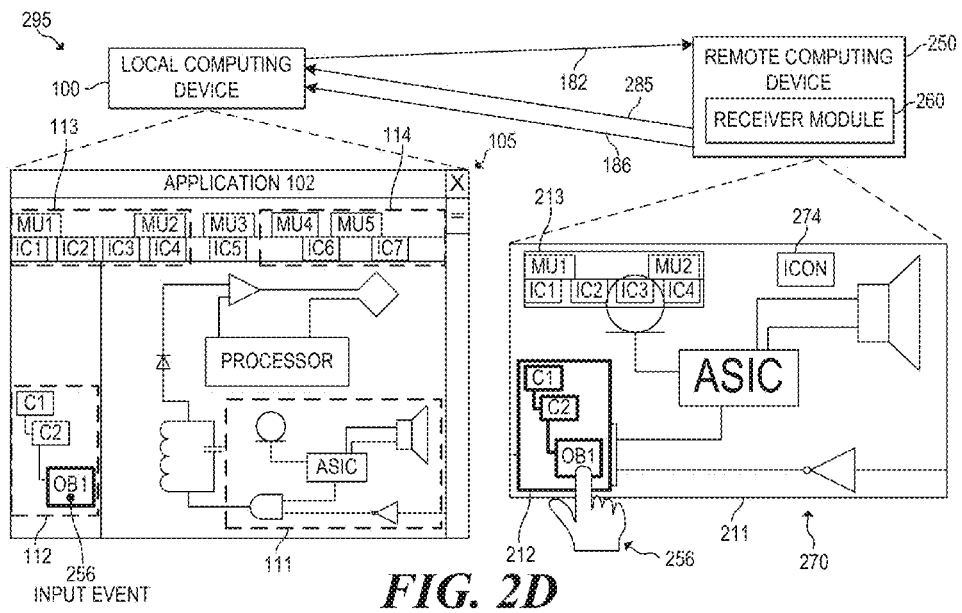
FIG. 2D is a diagram of the example computing system of FIG. 2C in which another input event is received within another input lens having input focus in the remote display area.

FIG. 2D is a diagram of the example computing system 295 of FIG. 2C in which another input event is received within another input lens having input focus in remote display area 270. In the example of FIG. 2D, after module 260 receives GUI input event 254, module 260 may receive a focus selection action associated with input lens 212. In response to detecting the focus selection action, receiver module 260 may provide an input focus command 285, identifying input lens 212, to local computing device 100. Instructions 122 may give input focus to input lens 212 in response to command 285 identifying input lens 212, as illustrated in FIG. 2D.

In some examples, when instructions 122 give input focus to an input lens, instructions 122 may generate composite display information 182 such that, if remote display area 270 is displayed, the input lens given input focus has at least one of increased size, increased scale, and decreased transparency relative to when the input lens did not have input focus. For example, after input focus moves from input lens 211 to input lens 212, instructions 122 may generate composite display information 182 such that input lens 212 has decreased transparency (e.g., is more opaque) relative to when it did not have input focus, as shown in FIGS. 2C and 2D. In some examples, input lens 211 may not be visible through input lens 212 after input lens 212 is given input focus. In such examples, when input focus moves away from input lens 212, input lens 212 may again be displayed as it was before receiving input focus (e.g., with greater transparency, etc.).

In the example of FIG. 2D, after instructions 122 give input focus to input lens 212, receiver module 260 may detect a GUI input event 256 input to remote computing device 250, as described above in relation to FIGS. 1 and 2C. In response to detecting GUI input event 256, module 260 may provide, to local computing device 100, event information 186 specifying at least the type and location of detected GUI input event 256. In such examples, instructions 126 may determine from information 186 that the detected GUI input event 254 was received within input lens 212, which has input focus.

In response, instructions 126 may invoke, at local computing device 100, the detected GUI input event 256 at the location of GUI 170 depicted in remote display area 270 where GUI input event 256 was received. In the example of FIG. 2D, based on the location included in event information 186, instructions 126 may invoke GUI input event 256 at GUI 170 at a location within lens area 112 corresponding to the location within input lens 212 at which the GUI input event 256 was received. For example, as illustrated in FIG. 2D, GUI input event 256 was received at object OBJ1 displayed in input lens 212, and instructions 126 may invoke GUI input event 256 at object OBJ1 in GUI 170 displayed in lens area 112. Although GUI input event 256 is received at a location of remote display area 270 where input lenses 211 and 212 overlap, instructions 126 invoke the GUI input event 256 within the region of GUI 170 depicted in input lens 212, since input lens 212 has input focus at the time of GUI input event 256.

In the example of FIG. 2D, instructions 122 may generate composite display information 182 such that, if remote display area 270 is displayed, a lens icon representing one of the lens areas is displayed instead of the input lens associated with the lens area, if the input lens does not have input focus. The lens icon may be partially transparent, as described herein in relation to the display of input lenses that do not have input focus. For example, instructions 122 may generate the composite display information 182 such that lens icon 274 representing lens area 114 is displayed instead of an input lens 214 associated with lens area 114, if input lens 214 does not have input focus. In such examples, input lens 214 may be displayed in remote display area 270 if input focus is given to input lens 214. In some examples, any given lens area may be represented by a respective lens icon in remote display area 270 when the associated input lens does not have input focus, rather than displaying the associated input lens when it does not have input focus.

Figure 2E:
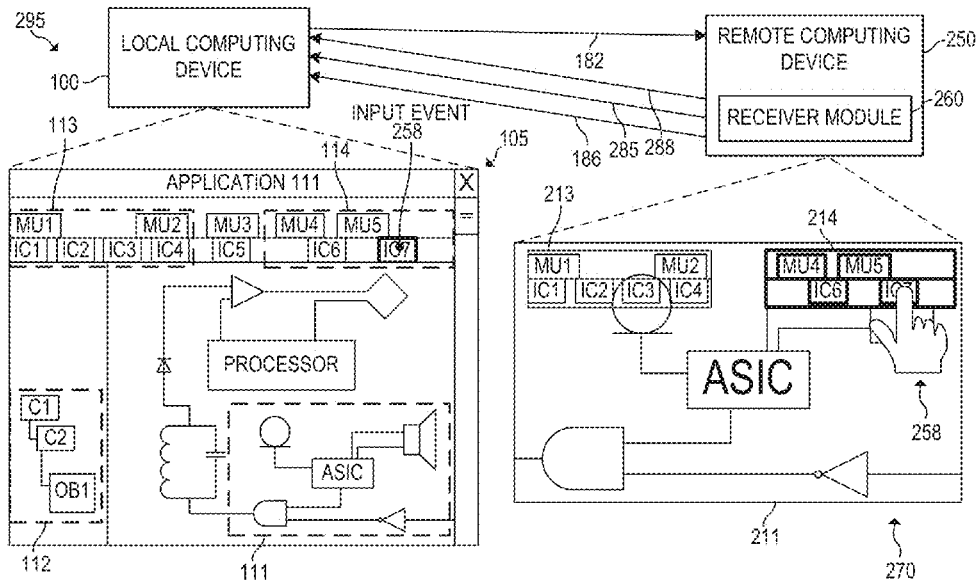
FIG. 2E is a diagram of the example computing system of FIG. 2D in which an input event is received within an input lens displayed when it has input focus.

FIG. 2E is a diagram of the example computing system 295 of FIG. 2D in which an input event is received within an input lens displayed when it has input focus. In the example of FIG. 2E, after invoking GUI input event 256 at GUI 170, as described above in relation to FIG. 2D, module 260 may receive a focus selection action associated with input lens 214. In response to detecting the focus selection action, receiver module 260 may provide an input focus command 285, identifying input lens 214, to local computing device 100. In response to command 285, instructions 122 may give input focus to input lens 214, as illustrated in FIG. 2E. In such examples, in response to giving input focus to input lens 214, instructions 122 may generate composite display information 182 such that, if remote display area 270 is displayed, input lens 214 associated with lens area 114 is displayed in remote display area instead of lens icon 274. In such examples, input lens 214 may be displayed as an input lens having input focus (e.g., it may be more opaque than an input lens not having input focus). As shown in FIG. 2E, input lens 214 may depict the region of GUI 170 displayed in lens area 114.

In the example of FIG. 2E, module 260 may receive a predefined control action, such as a predefined lens hiding action that may be performed to hide an input lens of remote display area 270. In response, module 260 may provide a hiding command 288 to local computing device 100. In response to hiding command 288, instructions 122 may generate composite display information 182 such that, if remote display area 270 is displayed, a previously displayed input lens is not displayed in remote display area 270. For example, in response to hiding command 288, instructions 122 may hide the last input lens to have input focus prior to the input lens currently having input focus. In such examples, in response to hiding command 288, instructions 122 may generate information 182 such that input lens 212, which previously had input focus, is not displayed in remote display area 270, as illustrated in FIG. 2E. In other examples, another input lens may be hidden in response to command 288. In some examples, the lens hiding action may comprise a three-finger tapping action performed twice in quick succession on a touch-sensitive display. In other examples, lens hiding actions may be any suitable predefined control action as described above.

In the example of FIG. 2E, after instructions 122 give input focus to input lens 214, receiver module 260 may detect a GUI input event 258 input to remote computing device 250, as described above in relation to FIGS. 1 and 2C. In response, module 260 may provide event information 186 specifying at least the type and location of detected GUI input event 258 to local computing device 100. In such examples, instructions 126 may determine from information 186 that the detected GUI input event 258 was received within input lens 214, which has input focus. In response, based on the location included in event information 186, instructions 126 may invoke GUI input event 258 at GUI 170 at a location within lens area 114 corresponding to the location within input lens 214 at which the GUI input event 258 was received. For example, as illustrated in FIG. 2E, GUI input event 258 was received at icon IC7 depicted in input lens 214, and instructions 126 may invoke GUI input event 258 at icon IC7 in GUI 170 displayed in lens area 114.

Figure 2F:
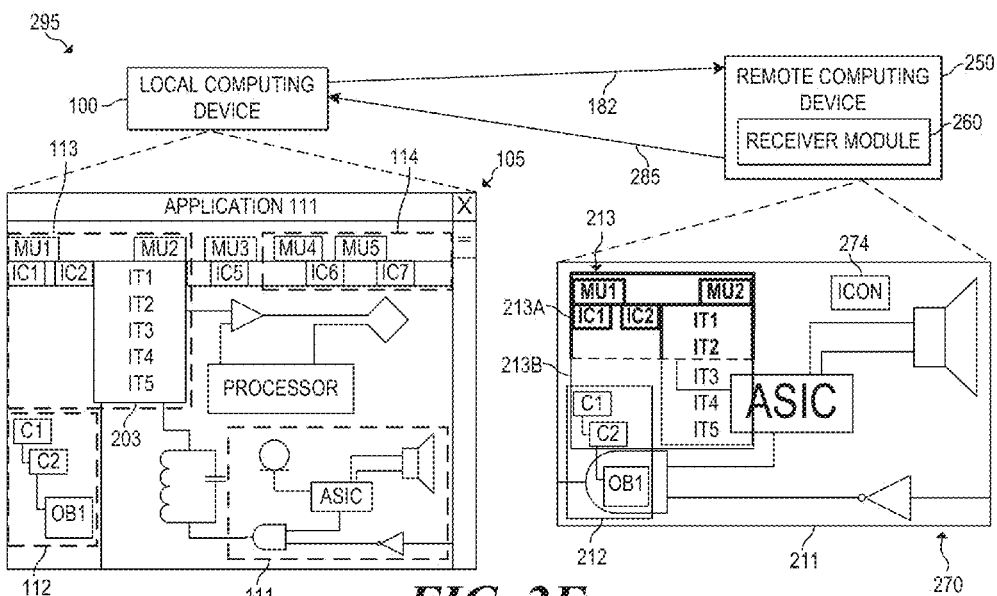
FIG. 2F is a diagram of the example computing system of FIG. 2D in which an input lens of the remote display area has a greater size when it has input focus.

FIG. 2F is a diagram of the example computing system 295 of FIG. 2D in which an input lens 213 of remote display area 270 has a greater size when it has input focus. In the example of FIG. 2F, after invoking GUI input event 256 at GUI 170, as described above in relation to FIG. 2D, module 260 may receive a focus selection action associated with input lens 213. In response, receiver module 260 may provide an input focus command 285 identifying input lens 213 to local computing device 100. Instructions 122 may give input focus to input lens 213 in response to command 285, as illustrated in FIG. 2F. In some examples, when input lens 213 has input focus, instructions 122 may generate composite display information 182 such that, if remote display area 270 is displayed, input lens 213 is larger than when it did not have input focus and different portions of input lens 213 have different levels of transparency.

For example, in response to command 285, instructions 124 may increase the size of lens area 113 may increase, and instructions 122 may generate information 182 such that input lens 213 is larger and depicts the larger region of GUI 170 displayed in changed lens area 113. In such examples, expanding the size of input lens 213 and the associated lens area 113 may allow a cascaded menu area 203, opened in response to interaction with menu MU2, to be fully displayed in input lens 213. In some examples, menu area 203 may be only partially displayed if the respective sizes of input lens 213 and lens area 113 were not increased. In the example of FIG. 2F, the larger input lens 213 displayed when input lens 213 has input focus may also include first and second portions 213A and 213B, wherein second portion 213B is more transparent than first portion 213A. In such examples, the full cascaded menu area 203 may be displayed without blocking from view all content overlapping with input lens 213. In other examples, an entire input lens may have a uniform level of transparency after the size of the input lens in changed when it receives input focus.

Figure 2G:
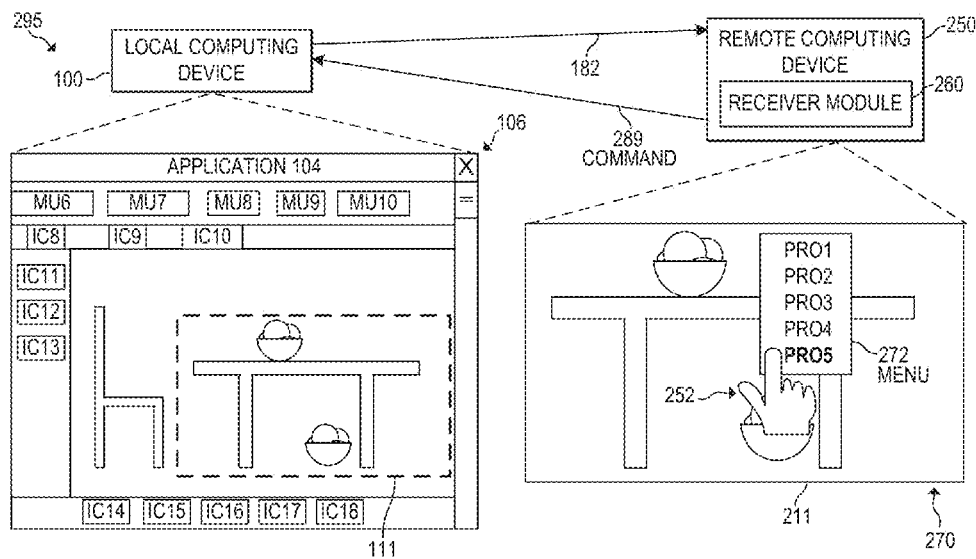
FIG. 2G is a diagram of the example computing system of FIG. 2D in which a selection of one of a plurality of lens profiles is received by the remote computing device.

FIG. 2G is a diagram of the example computing system 295 of FIG. 2D in which a selection of one of a plurality of lens profiles is received by remote computing device 250. In the example of FIG. 2G, input lens 111 may be utilized to open another application 104 at local computing device 100. After opening application 104, GUI 170 may display a window 106 of application 104, which may be a graphics editing application, for example. In the example of FIG. 2G, window 106 comprises an application content area, and a plurality of control areas. The application content area displays a photograph editable with application 104. The control areas include a menu toolbar including menus MU6-MU10, a first icon toolbar including icons IC8-IC10, a second icon toolbar including icons IC11-IC13, and a third icon toolbar including icons IC14-IC18.

In the example of FIG. 2G, a portion of the photograph displayed at GUI 170 within lens area 111 may be depicted in input lens 211 of remote display area 270. In the example of FIG. 2G, input lenses 212 and 213, and lens icon 274 may each be hidden via predetermined lens hiding actions, as described above in relation to FIG. 2E. In some examples, all input lenses (and icons representing input lenses) but one may be hidden via a predetermined lens hiding action, such as, for example, an action comprising a three-finger tapping action performed three times in quick succession. Each of lens areas 112-114 may still be defined at local computing device 100 when an associated input lens or lens icon is hidden.

In the example of FIG. 2G, module 260 may receive a predefined profile selection action, which may be any suitable control action as described above. In response to the profile selection action, module 260 may display a profile menu 272 in remote display area 270. In other examples, module 260 may display profile menu 272 in response to operation of a control function (e.g., a menu, icon, etc.) of a GUI of remote computing device 250, or in response to operation of any other suitable input device (e.g., a button or other hardware control) of remote computing device 250, or a combination thereof. The profile menu 272 may display representations of a plurality of lens profiles PRO1-PRO5 for selection. As used herein, a "lens profile" is a collection of information defining at least one lens area. Although five lens profiles are represented in menu 272 of FIG. 2G, menu 272 may display representations of any number of lens profiles. In the example of FIG. 2G, after displaying menu 272, module 260 may receive another profile selection action 252, which may comprise selection of one of the lens profile representations of menu 272. For example, a user may select lens profile PRO5 via profile selection action 252, which may comprise clicking or tapping on a representation of lens profile PRO5 in menu 272. In response, module 260 may provide a profile selection command 289 identifying lens profile PRO5 to local computing device 100.

Figure 2H:
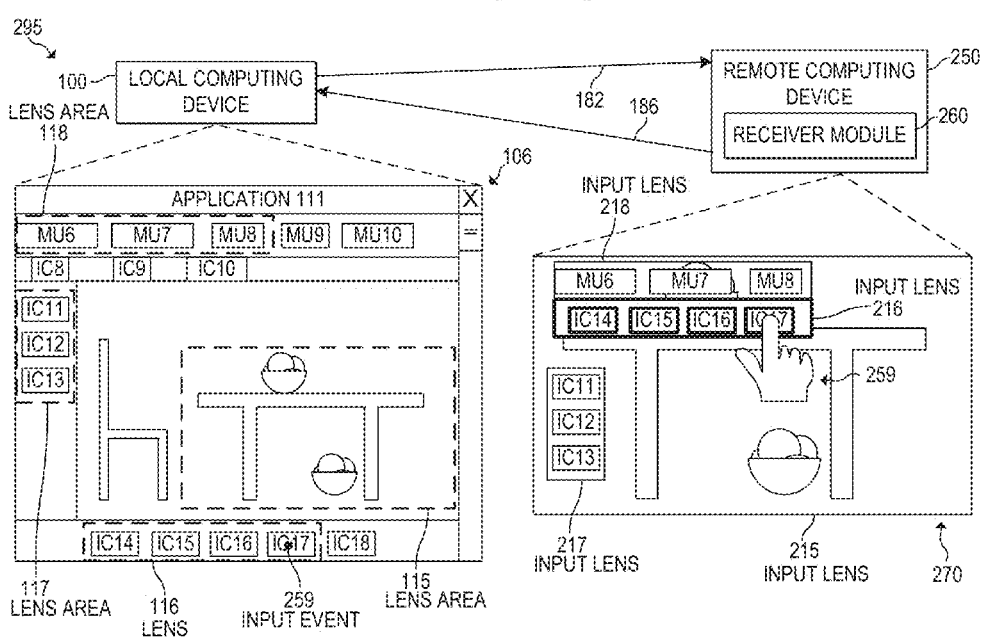
FIG. 2H is a diagram of the example computing system of FIG. 2G in which an input event is received within an input lens of the selected lens profile.

FIG. 2H is a diagram of the example computing system 295 of FIG. 2G in which an input event is received within an input lens of the selected lens profile. In the example of FIG. 2H, in response to profile selection command 289 identifying lens profile PRO5, instructions 122 may generate information 182 based on the lens areas defined by lens profile PRO5 instead of lens areas used before the selection (e.g., lens areas 111-114). In some examples, instructions 122 may store an indication of the selected lens profile to be used to generate information 182. In the example of FIG. 2H, lens profile PRO5 defines a plurality of lens areas 115-118, including, for example, the dimensions and location of each lens area.

In the example of FIG. 2H, instructions 122 may generate information 182 based on lens areas 115-118 of selected lens profile PRO5. In such examples, information 182 may be useable by remote computing device 250 to generate a remote display area 270 including input lenses 215-218 depicting the regions of GUI 170 displayed in lens areas 115-118, respectively. In some examples, lens profiles may specify how to arrange input lenses in remote display area 270, and the location at which an input lens is displayed in area 270 may not correspond to the location of the associated lens area relative to GUI 170. For example, in the example of FIG. 2H, lens profile PRO5 may specify that instructions 122 generate information 182 such that lens 215 is coextensive with remote display area 270, input lenses 216 and 218 are displayed proximate an upper edge of area 270, and input lens 217 is displayed on a left side of area 270. In some examples, a lens profile may also specify a first input lens to have input focus when the lens profile is applied. After displaying remote display area 270 in accordance a selected lens profile (e.g., lens profile PRO5), the regions of GUI 170 depicted within the input lenses may be changed in response to view manipulation actions by, for example, altering associated lens areas, as described above. In some examples, module 260 may detect a predefined initial profile state action, which may be one of the predefined control actions described above in relation to FIG. 1. In response to detecting the initial profile state action, module 260 may command local computing device 100 to return area 270 to the initial state specified by the selected profile. In response to the command, instructions 122 may, for example, return each lens areas of the profile to its initial state specified in the profile.

In some examples, when input lens 216 has input focus, receiver module 260 may detect a GUI input event 259 input to remote computing device 250, as described above. In response, module 260 may provide event information 186 to local computing device 100, and instructions 126 may determine from information 186 that the detected GUI input event 259 was received within input lens 216, which has input focus, as described above. Based on the location included in event information 186, instructions 126 may invoke GUI input event 259 at GUI 170 at a location within lens area 116 corresponding to the location within input lens 216 at which the GUI input event 259 was received. For example, as illustrated in FIG. 2H, GUI input event 259 was received at icon IC17 depicted in input lens 216, and instructions 126 may invoke GUI input event 259 at icon IC17 in GUI 170 displayed in lens area 116. In some examples, functionalities described herein in relation to FIGS. 2A-2H may be provided in combination with functionalities described herein in relation to any of FIGS. 1 and 3-5.

FIG. 3 is a block diagram of an example computing system 395 including a profile module of a local computing device 200 to receive a selection of a lens profile from a remote computing device 250. In the example of FIG. 3, computing system 395 may comprise a local computing device 300 including a processor 101, an OS 304, a sender module 330, a memory 340, and a network interface 108. Sender module 330 may include modules 322, 324, 326, 328, and 329. In some examples, module 330 may include additional modules. The functionalities of sender module 330, including the functionalities of modules 322, 324, 326, 328, 329, and any other modules of module 330, may be implemented in the form of executable instructions encoded on a machine-readable storage medium, in the form of electronic circuitry, or a combination thereof. In some examples, executable instructions of sender module 330 may be executed by processor 101. Memory 340 may be a machine-readable storage medium. In some examples, OS 304 may comprise a GUI module 142, as described above in relation to FIG. 1.

Computing system 395 also comprises a remote computing device 250 including a receiver module 260, as described above in relation to FIGS. 2A-2H. In the example of FIG. 3, module 260 includes modules 362, 364, 366, and 368. In some examples, module 260 may include additional modules. The functionalities of receiver module 260, including the functionalities of modules 362, 364, 366, 368, and any other modules of module 260, may be implemented in the form of executable instructions encoded on a machine-readable storage medium, in the form of electronic circuitry, or a combination thereof. In such examples, executable instructions of module 260 may be executed by a processor of remote computing device 250.

In the example of FIG. 3, remote computing device 250 may include a touch-sensitive display 355. As used herein, a "touch-sensitive display" may be any combination of hardware components capable of outputting a video signal and receiving user input in the form of touch. In some examples, a touch-sensitive display may be a multi-touch sensitive display that may receive multiple touch inputs simultaneously. A touch-sensitive display may include, for example, components of any display technology suitable for outputting a received video signal (e.g., remote display information) and may also include components for detecting touch, such as the components of, for example, a resistive, capacitive, surface acoustic wave, infrared, optical imaging, dispersive signal sensing, in-cell system, or the like. In examples described herein, a touch-sensitive display may output touch information identifying received user input.

In the example of FIG. 3, profile module 324 may receive, from remote computing device 250, a selection of one of a plurality of lens profiles. In some examples, the selection may be a profile selection command. Each of the lens profiles may specify a plurality of lens areas, and each of the lens areas may define a respective region of a GUI of local computing device 300. In such examples, display module 322 may generate composite display information 182, useable by remote computing device 250 to display a remote display area 270, based on the selected lens profile. For example, module 322 may generate information 182 useable to display a remote display area 270 including a plurality of input lenses each depicting a region of the GUI defined by a respective lens area of the selected lens profile. In such examples, module 322 may provide information 182 to remote computing device 250 via network interface 108. In the example of FIG. 3, display module 362 of remote computing device 250 may display remote display area 270 on touch-sensitive display 355 based on information 182 received from local computing device 100. Module 362 may display remote display area 270 on a portion of display 355 (as shown in FIG. 3), or such that area 270 is coextensive with display 355.

In the example of FIG. 3, receiver module 260 may comprise an input module 364 including a detection module 366 and an event module 368. In some examples, detection module 366 may detect control actions input to remote computing device 250, as described above in relation to FIG. 1. For example, module 366 may detect profile selection actions input to remote computing device 250 (e.g., via display 355), as described above in relation to FIG. 2G. In response to detecting a profile selection action specifying a lens profile to apply at local computing device 300, module 366 may provide to local computing device 300 a profile selection command 289 identifying the lens profile specified by the detected profile selection action. In response to command 289, profile module 324 may apply the selected lens profile by, for example, informing display module 322 of the selection, flagging the selected profile, or the like. Module 322 may then generate information 182 based on the lens areas defined by the selected lens profile.

In the example of FIG. 3, memory 340 may store a plurality of lens profiles 330, each specifying a plurality of lens areas, as described above in relation to FIGS. 1-2H. For example, the plurality of lens profiles 330 may include individual lens profiles 332, 334, and 336. Although FIG. 3 illustrates three lens profiles, in other examples the plurality of lens profiles 330 may include more or fewer than three lens profiles. In other examples, lens profiles 330 may be stored remotely from local computing device 300. In some examples, each lens profile may include a plurality of lens profile parameters. Example parameters may include, for example, the number of lens areas specified by the profile and, for each of the lens areas, the dimensions and location of the lens area relative to a GUI of the local computing device both for when an associated input lens has input focus and for when the associated input lens does not have input focus. Example parameters may also include, for example, for each lens area, the dimensions and location of the associated input lens in the remote display area both for when the input lens has input focus and for when the input lens does not have input focus. Example parameters may also include, for at least one lens area, a lens icon to represent the lens area when the associated input lens does not have input focus. Example parameters may also specify predefined control actions to give input focus to respective input lenses associated with the lens areas, and the level of transparency for an input lens for when it has input focus and for when it does not have input focus. Example parameters may also specify how to handle input detected outside of an input lens that has focus (e.g. ignore the input, pan/zoom input lens, dynamically resize input lens, etc.), and other parameters to provide suitable input lens appearance (e.g., contrast, legibility, etc.). In addition, global behavior independent of any input lens having input focus may be specified in parameters of the profile to set profile-specific mappings of input (e.g., control actions, input events, etc.) detected at the remote computing device to operations at the local computing device. For example, parameters may specify a profile-specific mapping of input events detected at the remote computing device to input events invoked at the local computing device. Also, for example, parameters may specify predefined control actions for reverting to an initial profile state, for hiding all input lenses but one (e.g., a content input lens), for switching to another profile (e.g., associated with the same application), and the like, or a combination thereof. In some examples, when a profile is selected, the local computing device may provide at least some of the information contained in the selected profile to the remote computing device. For example, the local computing device may provide information defining the profile-specific mappings of certain control actions for the selected profile to the remote computing device, so that the remote computing device may detect control actions and generate commands in accordance with the profile-specific mappings. Also, as noted above, in some examples, the remote computing device may perform at least some processing based on received composite display information to generate information to display as the remote display area. In such examples, remote computing device may utilize received profile information (e.g., input lens layering information, etc.) when performing the processing to display the remote display area.

In the example of FIG. 3, each lens profile of the plurality 330 includes the number of lens areas specified by the profile, the respective dimensions of the lens areas, and the respective locations of the lens areas relative to the GUI of local computing device 300. For example, as shown in FIG. 3, lens profile 332 comprises a plurality of lens parameters 344, including a parameter 346 indicating the number of lens areas specified by lens profile 332, a parameter 348 specifying the respective dimensions of the lens areas of lens profile 332, and a parameter 348 specifying the respective locations of the lens areas of lens profile 332 relative to the GUI of local computing device 300. In some examples, each lens profile of plurality 330 may also define the arrangement, in remote display area 270, of input lenses associated with the lens areas specified by the lens profile. In such examples, display module 322 may generate composite display information 182 such that, if remote display area 270 is displayed, the input lenses are arranged in the remote display area as specified in the selected lens profile.

In some examples, at least some lens profiles 330 may be application lens profiles associated with respective applications of local computing device 300. In the example of FIG. 3, lens profile 332 may be an application lens profile associated with a first application of local computing device 300, and lens profile 334 may be an application lens profile associated with a second application of local computing device 300. In such examples, each of the application lens profiles may include information identifying the application associated with the profile. For example, lens profile 332 may include information 342 identifying the application associated with lens profile 332. In some examples, for each lens profile associated with an application of local computing device 300, the respective locations of the lens areas defined by the lens profile may be specified relative to a window of the application associated with the lens profile. In other examples, for at least some of lens profiles 330, the respective locations of the lens areas defined by the profile are specified relative to the dimensions of a frame of the GUI generated at local computing device 300 for display, rather than relative to a particular window of the GUI.

In the example of FIG. 3, lens profiles 330 may include at least one desktop lens profile 336, in addition to application lens profiles. In some examples, the desktop lens profile 336 may be a default lens profile, and profile module 324 may select desktop lens profile 336 if no lens profile selection has been received from a remote computing device. In some examples, desktop lens profile 336 defines a lens area defining a region of the GUI including a portion of a desktop control area of the GUI to be depicted in one of the input lenses of remote display area 270. In such examples, a desktop control area of the GUI may include any control features (e.g., toolbars, icons, menus, etc.) that are accessible separate from any application window. For example, desktop control areas may include features of a desktop displayed by a GUI.

In the example of FIG. 3, display module 322 may generate composite display information 182 based on lens areas defined in desktop lens profile 336. Remote computing device 250 may use such information 182 to generate remote display area 270 including input lenses 311-313 associated with respective lens areas of desktop lens profile 336. In such examples, input lens 311 may depict a region of the GUI at which icons may be displayed when no application window is open, input lens 312 may depict a menu, toolbar, or other control area displayed at the bottom of the frame of the GUI, and input lens 313 may display a central portion of the GUI. In some examples, input lens 312 may initially have input focus so that a user may conveniently access the depicted control area to start an application, for example.

Additionally, in the example of FIG. 3, sender module 330 comprises an input module 326 including a view module 328 and an event module 329. In such examples, view module 328 may, for any particular one of the input lenses depicted in remote display area 270, change which region of the GUI is depicted in the particular input lens without changing which region of the GUI is depicted in any other input lens, as described above in relation to FIGS. 1-2C. Module 328 may change which region is depicted in the particular input lens in response to detection, at remote computing device 250, of a view manipulation action associated with the particular input lens. For example, detection module 366 may detect a view manipulation action input at remote computing device 250 and, in response, provide a view manipulation command 287 to local computing device 300 specifying a view manipulation operation and a location, as described above. In response to command 287, view module 328 may determine which input lens is associated with command 287, and change which region of the GUI is displayed in that input lens, as described above in relation to instructions 124 of FIG. 1.

Also, in the example of FIG. 3, event module 329 may, in response to detection of a GUI input event with remote computing device 250 within any given one of the input lenses displayed in remote display area 270, when the given input lens has input focus, invoke the GUI input event at local computing device 300 within the region of the GUI depicted in the given input lens, as described above in relation to FIG. 1. In such examples, remote computing device 250 may provide event information 186, specifying at least the type and location of the detected GUI input event, to local computing device 300. In such examples, event module 329 may invoke the GUI input event at local computing device 300 in response to event information 186. In some examples, functionalities described herein in relation to FIG. 3 may be provided in combination with functionalities described herein in relation to any of FIGS. 1-2H and 4-5.

Figure 4:
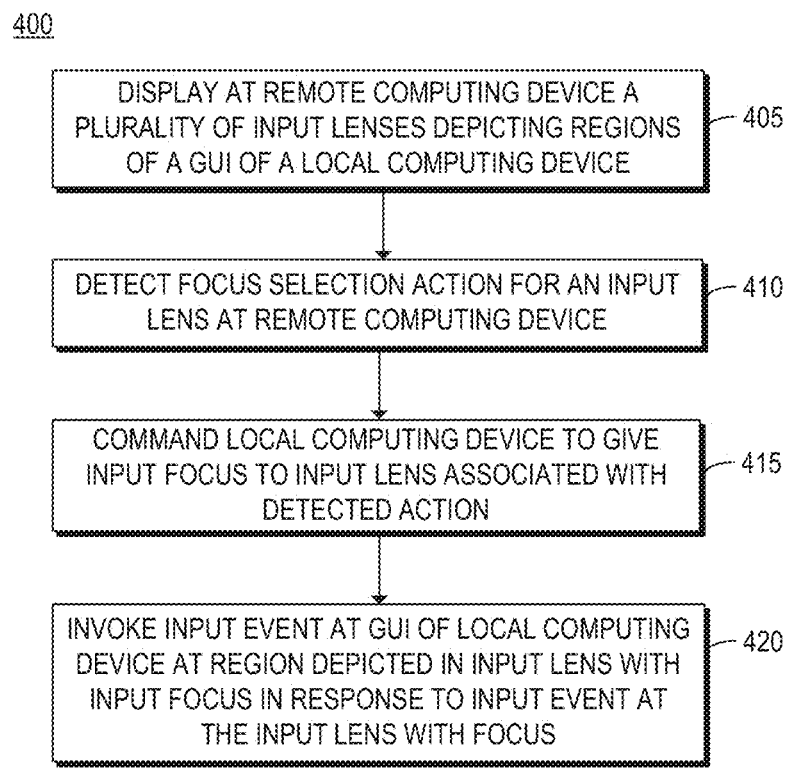
FIG. 4 is a flowchart of an example method for displaying a remote display area at a remote computing device based on composite display information received from a local computing device.

FIG. 4 is a flowchart of an example method 400 for displaying a remote display area at a remote computing device based on composite display information received from a local computing device. Although execution of method 400 is described below with reference to computing system 295 of FIGS. 2A-2H, other suitable components for execution of method 400 can be utilized (e.g., computing system 395). Additionally, method 400 may be implemented in the form of executable instructions encoded on a machine-readable storage medium, in the form of electronic circuitry, or a combination thereof.

At 405 of method 400, remote computing device 250 may display, in a remote display area 270, a plurality of input lenses each depicting a respective region of a GUI 170 of a local computing device 100. In such examples, receiver module 260 of remote computing device 250 may display the plurality of input lenses based on composite display information 182 received from local computing device 100. At 410, remote computing device 250 may detect any one of a plurality of different focus selection actions, each associated with a respective one of the displayed input lenses. At 415, remote computing device 250 may command local computing device 100 to give input focus to whichever of the input lenses is associated with the detected focus selection action.

At 420 of method 400, local computing device 100 may invoke a GUI input event at a location of the GUI depicted within whichever of the input lenses has input focus, in response to detection of the GUI input event at a location of remote display area 270 at which the input lens having input focus overlaps with another of the displayed input lenses. In such examples, instructions 126 of local computing device 100 may determine the appropriate GUI location at which to invoke the GUI input event, as described above in relation to FIG. 1. In some examples, instructions 126 may invoke the GUI input event via an API message, as described above in relation to FIG. 1.

Figure 5:
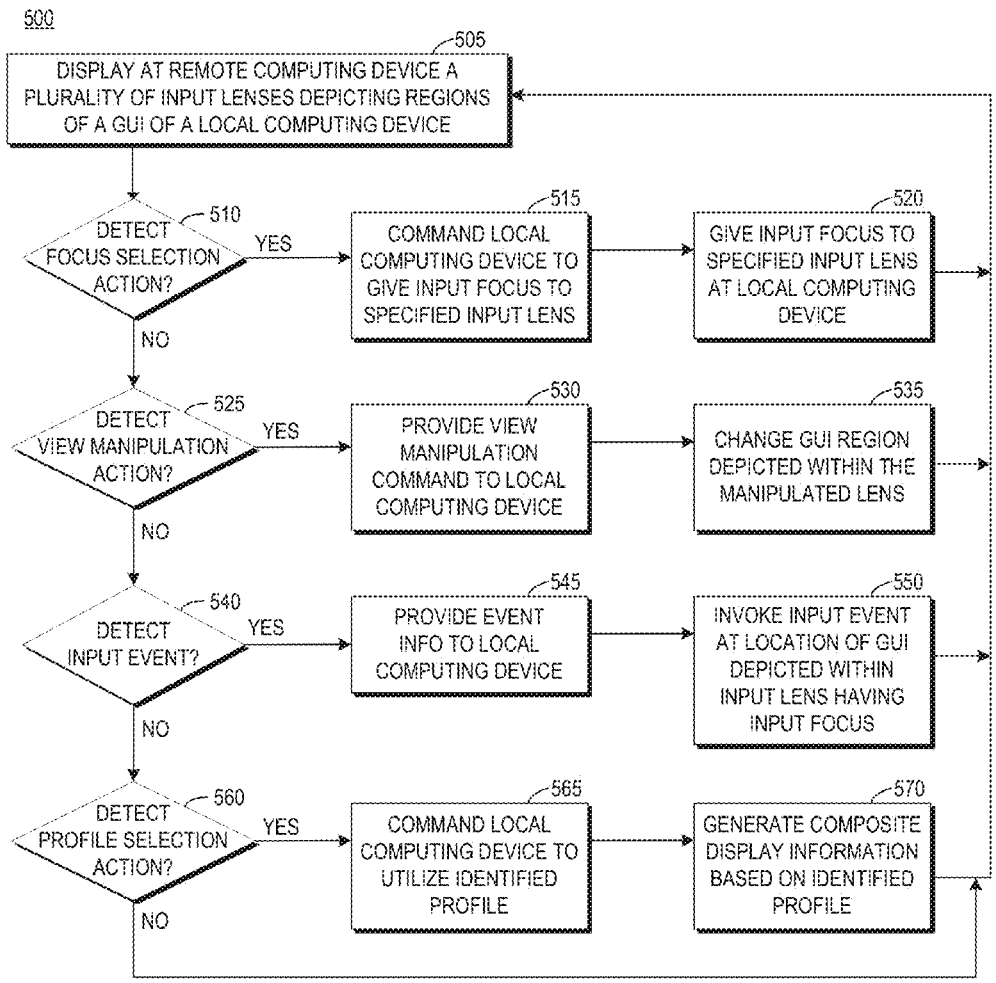
FIG. 5 is a flowchart of an example method for detecting a focus selection action with a remote computing device.

FIG. 5 is a flowchart of an example method 500 for detecting a focus selection action with a remote computing device. Although execution of method 500 is described below with reference to computing system 295 of FIGS. 2A-2H, other suitable components for execution of method 500 can be utilized (e.g., computing system 395). Additionally, method 500 may be implemented in the form of executable instructions encoded on a machine-readable storage medium, in the form of electronic circuitry, or a combination thereof.

At 505 of method 500, remote computing device 250 may display, in a remote display area 270, a plurality of input lenses each depicting a respective region of a GUI 170 of a local computing device 100. In such examples, receiver module 260 of remote computing device 250 may display the plurality of input lenses based on composite display information 182 received from local computing device 100. At 510, remote computing device 250 may detect whether any one of a plurality of different focus selection actions are input to remote computing device 250. In such examples, each of the focus selection actions may be associated with a respective one of the displayed input lenses. In some examples, each of the focus selection actions may be a different touch action detectable with a touch-sensitive display of remote computing device 250.

If one of the focus selection actions is detected at 510, method 500 may proceed to 515, wherein remote computing device 250 may command local computing device 100 to give input focus to whichever of the input lenses is associated with the detected focus selection action. At 520, in response to the command from remote computing device 250, instructions 122 of local computing device 100 give input focus to whichever of the input lenses is associated with the detected focus selection action. Method 500 may then proceed to 505.

If none of the focus selection actions is detected at 510, method 500 may proceed to 525, where remote computing device 250 may detect whether any view manipulation action associated with any particular one of the displayed input lenses is input to remote computing device 250. If a view manipulation action is detected, method 500 may proceed to 530, where remote computing device 250 may provide a view manipulation command to local computing device 100. At 535, in response to the view manipulation command, instructions 124 of local computing device 100 may change which region of GUI 170 is depicted within the particular input lens associated with the view manipulation action without changing which region of GUI 170 is depicted in any other input lens of remote display area 270. Method 500 may then proceed to 505.

If no view manipulation action is detected at 525, method 500 may proceed to 540, where remote computing device 250 may detect whether any GUI input event is input to remote computing device 250. If so, then method 500 may proceed to 545, where remote computing device 250 may provide information 186 identifying the detected GUI input event to local computing device 100. At 550, instructions 126 of local computing device 100 may invoke the GUI input event at a location of GUI 170 depicted within whichever of the input lenses has input focus, in response to detection of the GUI input event at a location of remote display area 270 at which the input lens having input focus overlaps with another of the displayed input lenses. In such examples, based on received information 186, instructions 126 may determine the appropriate GUI location at which to invoke the GUI input event, as described above in relation to FIG. 1. In some examples, instructions 126 may invoke the GUI input event via an API message, as described above in relation to FIG. 1. Method 500 may then proceed to 505.

If no GUI input event is detected at 540, method 500 may proceed to 560, where remote computing device 250 may detect whether a profile selection action identifying one of a plurality of lens profiles is input to remote computing device 250. If so, method 500 may proceed to 565, where remote computing device 250 may commanding local computing device 100 to generate composite display information 182 in accordance with the identified lens profile. At 570, in response to the command from remote computing device 250, instructions 122 of local computing device 100 may generate composite display information 182 in accordance with the identified lens profile. In such examples, each of the plurality of lens profiles specifies a plurality of lens areas, and each of the lens areas defines a region of GUI 170 to be depicted in a respective one of the input lenses in response to selection of the profile. Method 500 may then proceed to 505. Additionally, if no profile selection action is detected at 560, then method 500 may proceed 505.

What is claimed is:

1. A non-transitory machine-readable storage medium encoded with instructions executable by a local computing device to:

provide, to a remote computing device over a network, composite display information useable by the remote computing device to display a remote display area including a plurality of input lenses each depicting a respective region of a graphical user interface (GUI) displayed by the local computing device;

for any particular one of the input lenses, change which region of the GUI is depicted in the particular input lens without changing which region of the GUI is depicted in any other input lens;

in response to receiving, from the remote computing device, an input focus command identifying a first input lens of the plurality of input lenses, give input focus to the first input lens that displays a first region of the GUI displayed by the local computing device;

render a second input lens with a partial transparency on top of the first input lens based on the first input lens having the input focus;

in response to receiving, from the remote computing device, another input focus command identifying the second input lens, render the second input lens that displays a different second region of the GUI displayed by the local computing device with a second transparency based on the second input lens having the input focus, the second transparency less transparent than the partial transparency; and in response to detection of a GUI input event with the remote computing device within any given one of the displayed input lenses, when the given input lens has the input focus, invoke the GUI input event at the local computing device within the region of the GUI depicted in the given input lens.

2. The non-transitory machine-readable storage medium of claim 1, the plurality of input lenses comprising:

a content input lens coextensive with the remote display area and depicting a region of the GUI displaying an application content area of a window of an application of the local computing device; and a control input lens, smaller than the content input lens, depicting a region of the GUI displaying a control area of the window of the application.

3. The non-transitory machine-readable storage medium of claim 1, wherein the instructions are executable by the local computing device to, when the first input lens has input focus, generate the composite display information such that, if the remote display area is displayed:

the first input lens has at least one of increased size, increased scale, and decreased transparency relative to when the first input lens does not have input focus.

4. The non-transitory machine-readable storage medium of claim 1, wherein the instructions are executable by the local computing device to, when the first input lens has input focus, generate the composite display information such that, if the remote display area is displayed, the first input lens is larger than when the first input does not have input focus and different portions of the first input lens have different levels of transparency.

5. The non-transitory machine-readable storage medium of claim 1, wherein the instructions are executable by the local computing device to generate the composite display information such that, if the remote display area is displayed:

a lens icon representing a first lens area is displayed instead of the first input lens associated with the first lens area, if the first input lens does not have input focus; and the second input lens is not displayed in response to receiving, from the remote computing device, a hiding command corresponding to the second input lens.

6. The non-transitory machine-readable storage medium of claim 1, wherein a display of the remote computing device has a lower resolution than a display of the local computing device.

7. The non-transitory machine-readable storage medium of claim 1, wherein the plurality of input lenses overlap.

8. The non-transitory machine-readable storage medium of claim 1, wherein the instructions are executable by the local computing device to:
send, to the remote computing device, information in response to the input focus command to cause the remote computing device to give input focus to the first input lens; and
send, to the remote computing device, information in response to the another input focus command to cause the remote computing device to give input focus to the second input lens.

9. A local computing device comprising:
a processor; and
a non-transitory storage medium storing instructions executable on the processor to:
provide, to a remote computing device over a network, composite display information useable by the remote computing device to display a remote display area including a plurality of input lenses each depicting a respective region of a graphical user interface (GUI) displayed by the local computing device;
for any particular one of the input lenses, change which region of the GUI is depicted in the particular input lens without changing which region of the GUI is depicted in any other input lens;
in response to receiving, from the remote computing device, an input focus command identifying a first input lens of the plurality of input lenses, give input focus to the first input lens that displays a first region of the GUI displayed by the local computing device;
render a second input lens with a partial transparency on top of the first input lens based on the first input lens having the input focus;
in response to receiving, from the remote computing device, another input focus command identifying the second input lens, render the second input lens with a second transparency based on the second input lens having the input focus that displays a different second region of the GUI displayed by the local computing device, the second transparency less transparent than the partial transparency; and
in response to detection of a GUI input event by the remote computing device within any given one of the displayed input lenses, when the given input lens has the input focus, invoke the GUI input event at the local computing device within the region of the GUI depicted in the given input lens.

10. The local computing device of claim 9, wherein the instructions are executable on the processor to:
receive a selection of one of a plurality of lens profiles, each of the lens profiles specifying a number of lens areas, respective dimensions of the lens areas, and the respective locations of the lens areas relative to the GUI; and
generate the composite display information such that, if the remote display area is displayed, the plurality of input lenses are arranged in the remote display area as specified in the selected lens profile.

11. The local computing device of claim 10, further comprising:
a memory to store the plurality of lens profiles;
wherein each of the lens profiles is associated with a respective application of the local computing device; and
wherein, for each of the lens profiles, the respective locations of the lens areas are specified in the lens profile relative to a window of the associated application.

12. The local computing device of claim 10, wherein:
for each of the lens profiles, the respective locations of the lens areas are specified by the lens profile relative to dimensions of a frame of the GUI generated at the local computing device for display; and
the instructions are executable on the processor to select a desktop lens profile of the plurality of lens profiles if no lens profile selection is received from the remote computing device, wherein the desktop lens profile includes a lens area defining a region of the GUI including a portion of a desktop control area of the GUI.

13. The local computing device of claim 9, wherein the instructions are executable on the processor to:
send, to the remote computing device, information in response to the input focus command to cause the remote computing device to give input focus to the first input lens; and
send, to the remote computing device, information in response to the another input focus command to cause the remote computing device to give input focus to the second input lens.

14. A method comprising:
displaying, at a remote computing device based on composite display information received from a local computing device, a remote display area including a plurality of input lenses each depicting a respective region of a graphical user interface (GUI) displayed by the local computing device;
detecting, with the remote computing device, any one of a plurality of different focus selection actions, each associated with a respective one of the displayed input lenses,
in response to a first focus selection action, sending, by the remote computing device to the local computing device, a first input focus command identifying a first input lens of the plurality of input lenses, the identified first input lens displaying a first region of the GUI displayed by the local computing device;
receiving, by the remote computing device from the local computing device, first information responsive to the first input focus command;
based on the first input lens having the input focus responsive to the first information, rendering a second input lens with a partial transparency on top of the first input lens;
in response to a second focus selection action, sending, by the remote computing device to the local computing device, a second input focus command identifying the second input lens that displays a different second region of the GUI displayed by the local computing device;
receiving, by the remote computing device from the local computing device, second information responsive to the second input focus command;
based on the second input lens having the input focus responsive to the second information, rendering the second input lens with a second transparency that is less transparent than the partial transparency; and
in response to a GUI input event at a location of the GUI depicted within whichever of the input lenses has input focus, sending, by the remote computing device to the local computing device, event information of the GUI input event to cause the local computing device to invoke the GUI input event within the GUI.

15. The method of claim 14, further comprising:
detecting, with the remote computing device, a view manipulation action associated with any particular one of the displayed input lenses;
providing a view manipulation command to the local computing device with the remote computing device in response to the detection of the view manipulation action.

16. The method of claim 14, further comprising:
detecting, with the remote computing device, a profile selection action identifying one of a plurality of lens profiles;
commanding the local computing device to generate the composite display information in accordance with the identified lens profile.

\* \* \* \* \*

UNITED STATES PATENT AND TRADEMARK OFFICE
CERTIFICATE OF CORRECTION

PATENT NO. : 10,019,127 B2
APPLICATION NO. : 14/375819
DATED : July 10, 2018
INVENTOR(S) : Keith A. Fish et al.

Page 1 of 1

It is certified that error appears in the above-identified patent and that said Letters Patent is hereby corrected as shown below:

In the Claims

In Column 22, Line 49, Claim 4, after "input" insert -- lens --.

Signed and Sealed this
Twenty-first Day of May, 2019

Andrei Iancu
*Director of the United States Patent and Trademark Office*